United States Patent Office 3,434,518
Patented Mar. 25, 1969

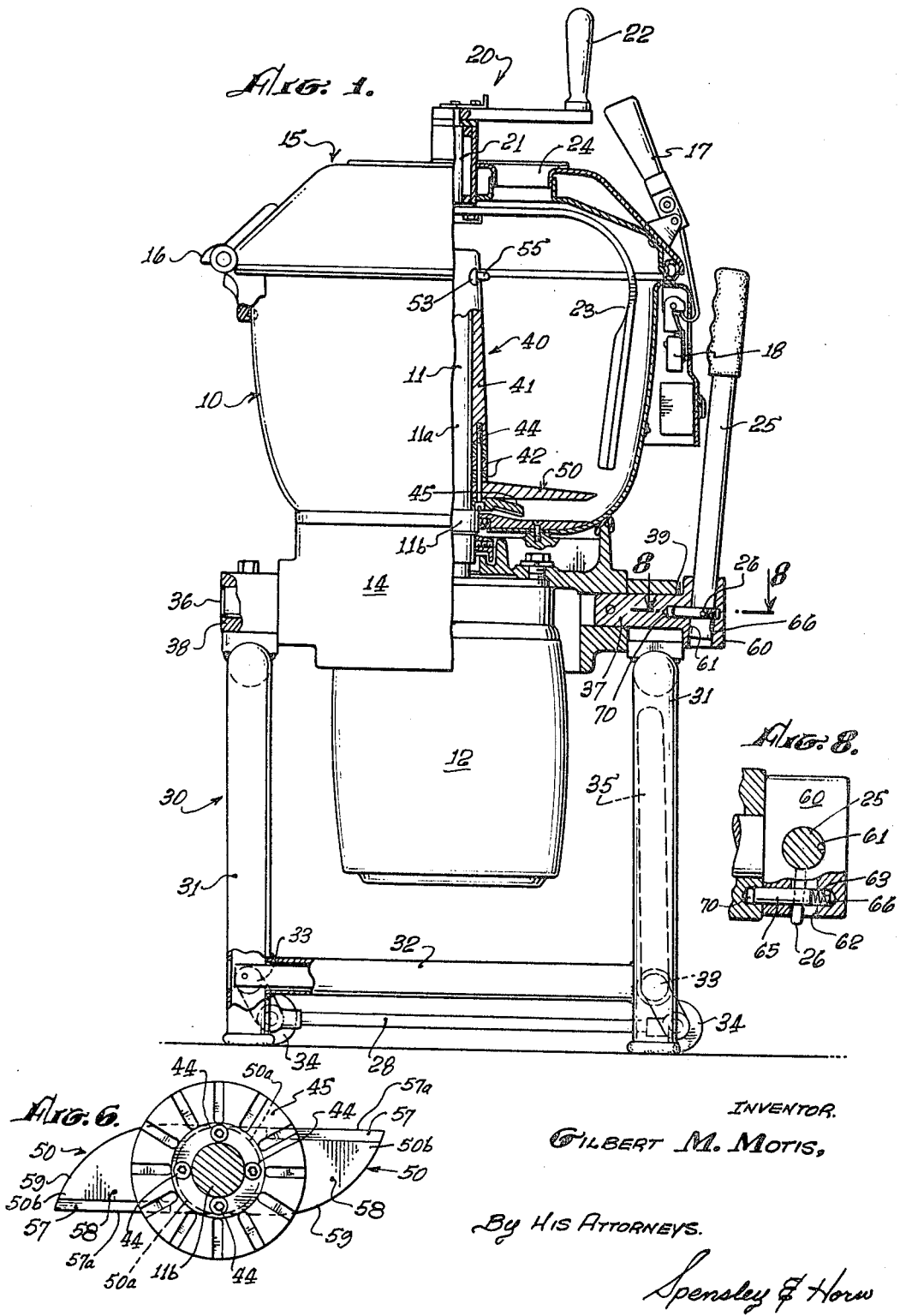

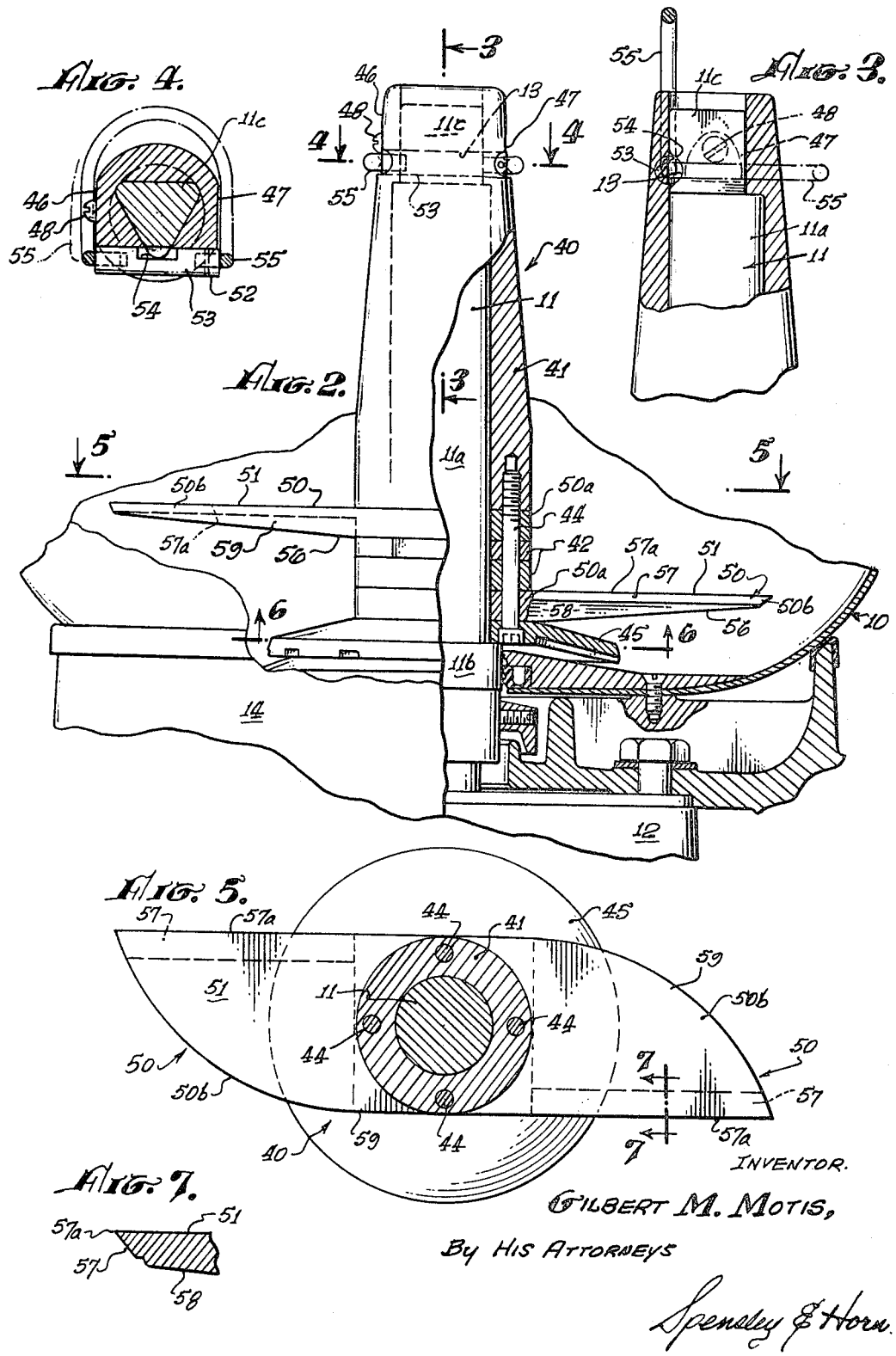

3,434,518
FOOD HANDLING APPARATUS
Gilbert M. Motis, Northridge, Calif., assignor, by mesne assignments, to Unimaco Inc., Manhasset, N.Y.
Continuation of application Ser. No. 564,898, July 13, 1966. This application Apr. 18, 1968, Ser. No. 722,489
Int. Cl. B02c 18/12
U.S. Cl. 146—68    12 Claims

ABSTRACT OF THE DISCLOSURE

A tubular mandrel having a cutting and mixing blade secured at on end thereof that consists of a straight leading cutting edge and a tapering undersurface, said mandrel having a restraining means at the upper end thereof for easily securing the mandrel to a drive shaft or for detaching said mandrel from said drive shaft.

---

This is a continuation of Ser. No. 564,898, filed July 13, 1966, and now abandoned.

This invention relates to food handling apparatus and more particularly to motor operated cutting or agitating apparatus of this character.

Commercial food handling apparatus for cutting vegetables and meat, mixing dough, etc., typically comprise a bowl having a drive shaft extending through a hole in the bowl bottom and projecting into the bowl, a motor mounted beneath the bowl and coupled to the drive shaft, and a blade assembly detachably mounted to the drive shaft within the bowl. The bowl-motor assemblage, due to its bulkiness and heavy weight, is usually pivotally mounted in a cradle type supporting framework for tilting to empty the bowl. The configuration of the prior art apparatus of this type is such as to require the use of tools for removal of the blade assembly, thereby resulting in sufficient inconvenience to users that the blade assembly is usually not removed during bowl cleaning and emptying operations. Thus, it is a common though potentially dangerous practice for the user to reach in between the blades to scrape the inside of the bowl or to scoop out remaining material when emptying the bowl. One aspect of the present invention is directed toward an improved blade assembly which is quickly and easily removable using only one hand, and without tools.

Various blade configurations have been developed in an effort to achieve an efficient cutting action, and to urge the food material toward the bottom of the bowl as it is being cut. It has been found that the saber type of blade, wherein the cutting edge is curved convexly and rearwardly, provides a desirable shearing action as opposed to the tearing tendency usually encountered with a straight edge aligned transversely through the axis of rotation of the blade. Adjustable pitch blades have been developed to allow adjustment of the sharp leading edges of the blade to positions higher than their trailing edges, in order to cause downward movement of the food material. However, adjustable pitch, saber curved blades are relatively difficult to manufacture and hence more expensive. Therefore, another aspect of the present invention is directed toward an improved and relatively simple blade configuration which provides a saber type cut with a straight leading edge and a desirable mixing action without the necessity of blade pitch.

In order to tilt the bowl-motor assembly in the above mentioned type of apparatus, an elongate lever is typically provided. However, it has been heretofore necessary when emptying the bowl for the user to hold the bowl in its lipped position by the continual application of a pushing force on the bowl, thereby rendering the emptying operation difficult of performance by a single person. Still another aspect of the present invention is directed toward an improved tipping lever which can be locked in predetermined positions by a simple rotation of the lever handle.

Briefly, the improved blade assembly of this invention is in the form of a tubular mandrel having rotating restraining means extending transversely through its upper end, and a bail affixed to the restraining means for rotating it between a first position of rotation wherein it is retentively engaged with the projecting end portion of the drive shaft within the bowl to restrain axial movement of the blade assembly on the drive shaft, and a second position of rotation at which it is disengaged from the projecting end portion of the drive shaft so that the blade assembly can be withdrawn from the drive shaft by pulling the bail axially of the drive shaft and away from the bottom of the bowl. In a presently preferred embodiment the drive shaft has a transversely extending depression near its upper end, the depression being of arcuate cross section, and the rotating restraining means comprising a cylindrical rod having an axially extending flat intermediate its ends. The radial positioning of the flat is such that the flat faces the hollow interior portion of the tubular mandrel, but does not extend thereinto, when the rod is in its second position of rotation, the arcuate surface of the rod being moved into retentive engagement within the transversely extending depression in the drive shaft when the rod is rotated to its first position of rotation. Thus, when the rod is in its first position of rotation the blade assembly is locked to the drive shaft, and when the rod is rotated to its second position it no longer engages the drive shaft so that the blade assembly may be easily withdrawn.

The improved cutting blade of the present invention can be fabricated from a metal bar, the blade defining a hub portion for attachment to the drive shaft and a projecting blade portion having a planar upper surface. The projecting blade portion defines a tapered lower surface being thickest adjacent the hub portion and thinnest at its projecting end, the projecting blade portion having a sharpened leading edge which defines a straight cutting edge proximate the upper surface of the blade and which is relieved to define an angularly inclined underlying surface extending downwardly and rearwardly to the tapered lower surface. The trailing edge of the blade is blunt and defines a convex curvature extending from the hub portion to the projecting end of the leading edge. Thus, the straight cutting edge of the blade is ahead of the axis of rotation of the blade, it having been found that this relationship results in a desirable saber type blade action. The tapering of the undersurface of the blade, in conjunction with the angularly inclined underlying surface at the relieved leading edge of the blade, provides a propeller type blade action which initiates a circulating type agitation of food in the bowl.

Accordingly, it is an object of the present invention to provide improved food handling apparatus.

It is also an object of the present invention to provide improved food handling apparatus of the character having a bowl with cutting blades secured to a drive shaft within the bowl, the drive shaft being rotated by a motor disposed outside the bowl.

It is another object of the present invention to provide an improved blade assembly for food handling apparatus of the character described.

It is a further object of the present invention to provide a blade assembly which is quickly and easily removeable without tools.

It is yet another object of the present invention to provide an improved cutting blade for food handling apparatus of the character described.

It is a still further object of the present invention to provide a simple cutting blade configuration which affords a saber type cut with a straight leading edge and a desirable mixing action without the necessity of blade pitch.

It is also an object of the present invention to provide an improved cutting blade which can be conveniently fabricated from bar stock.

It is another object of the present invention to provide an improved tipping lever mechanism for food handling apparatus of the character described.

It is still another object of the present invention to provide an improved tipping lever which can be locked in predetermined positions to maintain the cutting bowl in different attitudes.

The novel features which are believed to be characteristic of the present invention, together with further objects and advantages thereof, will be better understood from the following description in which the invention is illustrated by way of example. It is to be expressly understood, however, that this description is for the purpose of illustration only and that the true spirit and scope of the invention is defined by the accompanying claims.

In the drawing:

FIGURE 1 is an elevation view, partly in section, of apparatus constructed in accordance with the present invention;

FIGURE 2 is an elevation view, partly cut away, showing the blade assembly of the apparatus of FIGURE 1;

FIGURE 3 is a partly cut away view taken along the line 3—3 of FIGURE 2 showing a bail raised to a vertical position;

FIGURE 4 is a view taken along the line 4—4 of FIGURE 2 showing the bail raised to a vertical position;

FIGURE 5 is a view taken along the line 5—5 of FIGURE 2;

FIGURE 6 is a view taken along the line 6—6 of FIGURE 2;

FIGURE 7 is a view taken along the line 7—7 of FIGURE 5; and

FIGURE 8 is a view taken along the line 8—8 of FIGURE 1.

Referring now to the drawing, in which the same reference numerals denote identical parts in the different views, in FIGURE 1 there is shown a cutter bowl 10 of circular cross section mounted on a base 14 pivotally secured to a supporting framework generally indicated by the reference numeral 30. A vertical drive shaft 11 extends through the bottom of the bowl 10 and is adapted to be driven by a motor 12 secured to the bottom of the base 14. The base 14 with the bowl 10 and the motor 12 can be tilted by means of a lever 25, as will be explained in greater detail.

The bowl 10 is closed by a vaulted cover 15 hinged to the bowl by a hinge 16. The cover 15 is provided with a latching lever 17 which is detachably engageable with a latching mechanism 18 on the bowl rim, the latching mechanism 18 also providing an electrical interlock for the motor 12 so that the motor can be operated only when the cover 15 is closed and securely latched.

The cover 15 also includes manually operable stirring means generally indicated by the reference numeral 20, the stirring means comprising a shaft 21 extending through the center of the cover, a hand crank 22 fixedly secured to one end of the shaft atop the cover, and a paddle blade 23 fixedly secured to the other end of the shaft at the underside of the cover. A hole 24 is provided in the cover to permit viewing of the bowl contents or adding material while the apparatus is operating, the hole being provided with a suitable plug or cover plate.

The part of the drive shaft 11 projecting into the bowl 10 defines a cylindrical main body portion 11a intermediate an enlarged diameter bottom portion 11b, and a smaller top portion 11c of substantially triangular cross section, as can best be seen in FIGURES 2–4. The triangle apexes are rounded to the contour of the main body portion 11a. A horizontal channel 13, of substantially semicircular cross section, is provided in the top portion 11c at one of the triangle apexes, to allow detachable engagement of a blade assembly.

Detachably mounted to the drive shaft 11 in the bowl 10 is a blade assembly generally indicated by the reference numeral 40. The blade assembly 40 comprises the coaxial assemblage of a tubular mandrel 41, a pair of cutting blades 50 separated by spacing rings 42, and a disk blade 45. These various components are maintained in assemblage by four screws 44 passing through suitable holes in the disk blade 45, the cutting blades 50, the spacing rings 42, and into threaded holes in the bottom of the tubular mandrel 41. In the illustrated embodiment two cutting blades are used, the blades being oriented 180° apart. Note that one of the spacing rings 42 is the same thickness as the hub of the cutting blades 50, so that a third blade can be added if desired. By varying the thickness and location of the spacing rings 42 the blade height and separation can be adjusted. The disk blade 45 is of a conventional type used for the purpose of comminuting material at the very bottom of the bowl.

The central hole of the spacing rings and various blades are substantially equal to, but slightly greater than, the outer diameter of the main body portion 11a of the drive shaft, as is all but the uppermost portion of the tubular mandrel 41 which has a center aperture of a triangular cross section corresponding to the triangular top portion 11c of the drive shaft. The blade assemblage 40 is mounted on the drive shaft, supported by the shoulder formed between the main body portion 11a and the larger diameter bottom portion 11b, and with the triangular top portion 11c of the drive shaft mated within the triangular aperture in the top of the tubular mandrel.

Rotatably mounted within the uppermost portion of the tubular mandrel 41 is a locking rod 53, which is horizontally aligned and extends through an apex of the triangular center aperture. The main diameter of the locking rod 53 is slightly less than the diameter of the channel 13 in the triangular upper portion of the drive shaft, the central portion of the locking rod defining a rectangular notch 54. The depth of the notch 54 is such that when the rod is rotated so that the notch is vertically aligned and facing inwardly, the rod will not obstruct the triangular center aperture of the mandrel, as illustrated in FIGURE 4.

Fixedly secured to the ends of the locking rod 53 is a bail 55, the bail being secured to the rod in parallel alignment with the notch 54. The outer surface of the upper portion of the tubular mandrel 41 is provided with diametrically opposed flat surfaces 46 and 47, the flat 46 being provided with a slight projection, such as a screwhead 48, to provide a detent function. The bail 55 is affixed to the rod 53 by means of a pin 52, at the end of the rod adjacent the flat 47. The other end of the bail 55 is free for slight axial movement within the rod 53 so that the bail can ride over the screwhead 48 upon rotation of the bail, the natural resiliency of the bail material returning the bail to the configuration shown, upon clearing the screwhead.

To mount the blade assemblage 40 on the drive shaft 11 the bail 55 is grasped and lifted to its vertically aligned position shown in FIGURE 4. In this position the vertical alignment of the notch 54 of the locking shaft renders the triangular central aperture of the mandrel in an unobstructed condition. The blade assemblage is held by the bail 55 and rotated to bring the triangular aperture in the top of the mandrel into alignment with the triangular top portion of the drive shaft, with the locking rod 53 opposite the triangle apex containing the channel 13. The blade assemblage is then lowered onto the drive shaft until the disk blade 45 comes to rest on the upper surface of the bottom portion 11b of the drive shaft, as shown in FIGURE 3. In this position the locking rod 53 will be in alignment with the channel 13 in the upper triangular portion of the drive shaft. To lock the blade assemblage 40 against axial movement on the drive shaft, the bail 55 is rotated downwardly, over the screwhead 48, to the horizontal position indicated by the dashed lines in FIGURE 3, the bail resting on the shoulders defined at the lower ends of the flats 46 and 47. Rotation of the bail from its vertical to its horizontally aligned position rotates the notch 54 of the locking rod away from its vertical alignment and rotates the main body portion of the locking rod into the channel 13 in the top of the drive shaft. Thus, the locking rod 53 secures the blade assemblage against axial movement on the drive shaft since the rod now obstructs the triangular aperture in the top of the mandrel, the rod passing through the channel 13. The bail 55 is locked into its horizontally aligned position, the detent provided by the screwhead 48 preventing the bail from flying up on rotation of the drive shaft during machine operation.

To unlock the bail from its horizontally aligned position (and unlock the blade assemblage from the drive shaft) it is merely necessary to lift the bail upwards over the detent provided by the screwhead 48, which rotates the bail and the notch 54 to the position of vertical alignment and then withdraws the blade assemblage from the drive shaft. Thus, it is seen that the blade assemblage is quickly detachable and removable without tools, thereby facilitating blade removal during bowl scraping or cleaning operations. Also, different blade assemblies may be quickly interchanged, depending upon the type of action desired.

The illustrated embodiment utilizes two of the cutting blades 50, the blades being vertically spaced and oriented 180° with respect to each other. As mentioned hereinabove, the number of blades and blade height can easily be changed, as well as the respective orientation of the blades. For the particular type of cutting blades 50 presently used, it has been found that two blades, vertically spaced as shown, provide a most desirable cutting action. The cutting blades 50 are easily fabricable from plate stock of suitable thickness. FIGURES 2, 5 and 7 of the drawing show the cutting blades 50 in detail. Each of the cutting blades 50 has a planar upper surface 51, and comprises a central circular hub portion 50a and a projecting tapered blade portion 50b. The hub portion 50a is provided with a central circular hole of a diameter substantially equal to but slightly greater than the diameter of the main body portion 11a of the drive shaft. A series of four suitable spaced holes are provided for insertion of the screws 44. The diameter of the circular hub portion 50a is substantially equal to the diameter of the spacing rings 42 and the lower portion of the tubular mandrel 41. The blade portion 50b has a tapered lowermost edge surface 56 being thickest adjacent the hub portion 50a and thinnest at its projecting end. The projection blade portion has an angularly inclined surface portion 57 extending downwardly and rearwardly from the leading edge of the upper surface 51, to thereby define a straight cutting edge 57a. The underside of the blade is relieved to define an angularly inclined underlying substantially planar surface 58 extending to the lowermost edge surface 56. The trailing edge 59 of the blade is blunt and defines a convex curvature extending from the hub portion 50a to the projecting end of the leading edge. Therefore, the straight cutting edge of the blade 50 is ahead of the axis of rotation of the blade to give the desired saber blade type of action.

In operation, the inclined underlying surface 58 provides a propeller type of blade action which agitates the material in the bowl beneath the blades in a circulating manner to continually throw material upward into the path of the blades. Of course, other blade configurations could be utilized in combination with, or instead of the illustrated cutting blades 50, according to the material being handled and the type of blade action desired. The blunt trailing edge 59 of the illustrated blades 50 are ideal for mixing dough when the direction of rotation of the blade assemblage is reversed.

The supporting framework 30 is generally rectangular in form and is conveniently fabricable from metal pipe, the framework having vertically oriented legs 31 between which extend a pair of opposed horizontally aligned cross braces 32. Extending between the other two opposing pairs of legs are rotatable shafts 33 to each of which are affixed a pair of casters 34. A pair of links 28 pivotally interconnect corresponding casters on the opposed shafts 33 so that the shafts will rotate in unison upon actuation of an elongate lever 35, attached to one of the rotatable shafts, to lift the framework onto the casters. When the lever 35 is rotated to its uppermost position, the casters are slightly elevated so that the framework will be supported by the bottoms of the legs 31. When desiring to move the food handling apparatus it is merely necessary to rotate the lever 35 downward to raise the apparatus onto the casters, the apparatus then being easily moved.

The base 14 is rotatably mounted on the supporting framework 30 by means of journals 36 and 37 contained in bearing blocks 38 and 39 secured to the top of the supporting framework. Affixed to the outermost end of the journal 37 is a mounting block 60 containing a central aperture 61 into which is inserted the tilting lever 25. A transversely extending tapered aperture 62 extends from one end surface of the mounting block 60 into communication with the central aperture 61. A horizontally extending passageway 63 perpendicularly intersects the aperture 62, this passageway housing a swatted pin 65 and a compression spring 66, as can best be seen in FIGURE 8.

Projecting transversely from the lower portion of the lever 25 within the central aperture 61 of the mounting block, is a rod 26, the rod 26 extending through the slot in the pin 65 within the tapered aperture 62. Counterclockwise rotation of the lever 25 will cause the pin 65 to move deeper into the mounting 60, compressing the spring 66, the rod 26 acting as a lever arm. The bearing block 39 is provided with a hole 70 to receive the pin 65 when the bowl is in the upright operating position shown in FIGURE 1, the lever 25 being vertically oriented in this position. The force of the spring 66 urges the pin 65 toward the bearing block 39, and into the hole 70 when the apparatus is in its operating position, to thereby lock the bowl in its upright position. If it is desired to tilt the bowl, such as when emptying the bowl, it is merely necessary to rotate the lever 25 in a counterclockwise direction to cause withdrawal of the pin from the hole 70, thereby enabling movement of the lever 25 to tilt the motor-bowl assembly. The provision of additional holes, suitably circumferentially spaced from the hole 70, will enable locking of the motor-bowl assembly in various tilted positions, the assembly being locked in these various tilted positions, by urging of the pin 65 into the appropriate hole in response to the force of the compression spring 66. These additional locking positions provide a much desired operating convenience, since it has usually been necessary to employ one hand on the tilting lever to maintain the assembly in the desired tilted position.

Thus there has been described food handling apparatus utilizing an easily removeable blade assembly featuring a simple and improved cutting blade, the apparatus having an improved tipping lever so that the bowl can be locked in predetermined positions by a simple rotation of the lever handle. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. Food cutting apparatus comprising, in combination: a bowl defining a central hole in its bottom; a drive shaft extending through said central hole and projecting into said bowl; means below said bowl for rotating said drive shaft; and a blade assembly removably mounted on said drive shaft for rotation therewith within said bowl, said blade assembly comprising a tubular mandrel having at least one cutting blade projecting therefrom proximate its lower end near the bottom of said bowl and rotatable restraining means extending transversely therethrough proximate its upper end, and a bail affixed to said restraining means for rotation thereof between a first position of rotation at which said bail is projecting substantially transversely from said mandrel and at which said restraining means is retentively engaged with the projecting end portion of said drive shaft within said bowl to restrain axial movement of said blade assembly on said drive shaft and a second position of rotation at which said bail is projecting substantially axially from said mandrel and at which said restraining means is disengaged from said projecting end portion of said drive shaft to that said blade assembly can be withdrawn from said drive shaft by pulling said bail axially of said drive shaft and away from the bottom of said bowl.

2. The food cutting apparatus defined in claim 1, wherein the peripheral side surface of said drive shaft has a transversely extending depression therein near the projecting end thereof, and wherein said rotatable restraining means comprises an elongate rod so constructed and arranged so that a portion of said rod is retentively mated within the transversely extending depression in said drive shaft when said rod is in said first position of rotation and which does not extend into the transversely extending depression in said drive shaft when said rod is in said second position of rotation.

3. The food cutting apparatus defined in claim 2, wherein the transversely extending depression in said drive shaft is arcuate in cross section and wherein said rod is straight and of substantially circular cross section at its ends and having an axially extending elongate depression intermediate its ends, the radial positioning of said axially extending depression being such that said depression faces the hollow interior portion of said tubular mandrel when said rod is in said second position of rotation, the configuration of said axially extending depression being such that said rod does not extend into the hollow interior portion of said tubular mandrel when said rod is in said second position of rotation.

4. The food cutting apparatus defined in claim 1, wherein the outer longitudinal surface of said mandrel is circular in cross section and wherein said cutting blade projects substantially transversely from the longitudinal axis of said mandrel to define a planar upper surface in transverse alignment with the longitudinal axis of said mandrel and a tapered lower surface being thickest at said mandrel and thinnest at said projecting end, the leading edge surface of said blade being sharpened to define a straight cutting edge proximate the upper surface of said blade and being relieved to define an angularly inclined substantially planar underlying surface extending to said tapered lower surface, said straight cutting edge being in substantially tangential alignment with the longitudinal peripheral surface of said mandrel, said cutting blade further defining a convexly curved blunt trailing edge surface extending from a point on the longitudinal surface of said mandrel substantially diametrically opposite from said cutting edge to the projecting end of said leading edge.

5. A blade for rotary food cutting apparatus, said blade defining a hub portion for attachment to a drive shaft for rotation therewith and a projecting blade portion, said blade having a planar upper surface, said projecting blade portion defining a tapered lower surface being thickest adjacent said hub portion and thinnest at its projecting end, said projecting blade portion having a sharpened leading edge which defines a straight cutting edge proximate the upper surface of said blade and which is relieved to define an angularly inclined substantially planar underlying surface extending to said tapered lower surface, said projecting blade portion further defining a convexly curved blunt trailing edge extending from said hub portion to the projecting end of said leading edge.

6. In food cutting apparatus including a bowl defining a central hole in its bottom, a drive shaft extending through the central hole and projecting into the bowl, and means below the bowl for rotating the drive shaft, the improvement comprising a blade assembly removably mounted on said drive shaft for rotation therewith within said bowl, said blade assembly comprising a tubular mandrel having at least one cutting blade projecting therefrom proximate its lower end near the bottom of said bowl and rotatable restraining means extending transversely therethrough proximate its upper end, and a bail affixed to said restraining means for rotation thereof between a first position of rotation at which said restraining means is retentively engaged with the projecting end portion of said drive shaft within said bowl to restrain axial movement of said blade assembly on said drive shaft and a second position of rotation at which said restraining means is disengaged from said projecting end portion of said drive shaft so that said blade assembly can be withdrawn from said drive shaft.

7. Food cutting apparatus comprising, in combination: a bowl defining a central hole in its bottom; a drive shaft extending through said central hole and projecting into said bowl; means below said bowl for rotating said drive shaft; and a blade assembly removably mounted on said drive shaft for rotation therewith within said bowl, said blade assembly comprising a tubular mandrel having at least one cutting blade projecting therefrom proximate its lower end near the bottom of said bowl and restraining means extending transversely therethrough proximate its upper end, and actuating means operatively associated with said restraining means for moving the latter between a first position in which said restraining means is retentively engaged with the projecting end portion of said drive shaft within said bowl to restrain axial movement of said blade assembly on said drive shaft and a second position in which said restraining means is disengaged from said projecting end portion of said drive shaft so that said blade assembly can be withdrawn from said drive shaft axially of the latter and in direction away from the bottom of said bowl.

8. The food cutting apparatus as defined in claim 7, wherein said actuating means is a bail movable between a first location in which its projects substantially transversely of said mandrel and in which said restraining means is in said first position thereof and a second location in which said bail extends substantially axially from said mandrel and said restraining means is in said second position thereof.

9. The food cutting apparatus as defined in claim 7 wherein said restraining means is rotatable from one to the other of said positions.

10. The food cutting apparatus defined in claim 9, said drive shaft having a peripheral side surface provided with a transversely extending depression therein near the projecting end thereof, and said rotatable restraining means comprising an elongated rod constructed and arranged so that portion of said rod is retentively mated within said transversely extending depression in said peripheral side surface of said drive shaft when said rod is in said first position but does not extend into said transversely extending depression when said rod is in said second position.

11. The food cutting apparatus defined in claim 9, wherein said transversely extending depression is of arcuate cross-section and wherein said rod is straight and of substantially circular cross-section at its ends and having an axially extending elongated recess intermediate its ends, said recess being positioned and configurated so as to face radially inwardly of said tubular mandrel when said rod is in said second position whereby to prevent retentive mating of said portion of said rod within said depression in said drive shaft when said rod is in said second position.

12. In a food cutting apparatus including a bowl defining a hole in its bottom, a drive shaft extending through said hole and projecting into the bowl, and means associated with said drive shaft for rotating the same, the improvement comprising a blade assembly removably mounted on said drive shaft for rotation therewith within said bowl, said blade assembly comprising a tubular mandrel having at least one cutting blade projecting therefrom proximate one end thereof and rotatable restraining means extending transversely through said mandrel proximate the other end thereof, and engaging means associated with said restraining means for rotating the latter between a first position of rotation in which said restraining means is retentively engaged with said drive shaft within said bowl to restrain axial movement of said blade assembly on said drive shaft and a second position of rotation in which said restraining means is disengaged from said drive shaft so that said blade assembly can be withdrawn from the same.

References Cited

UNITED STATES PATENTS 2,894,551   7/1959   Otto _____ 146—68

W. GRAYDON ABERCROMBIE, *Primary Examiner.*